United States Patent [19]
Bynum et al.

[11] Patent Number: 5,644,170
[45] Date of Patent: Jul. 1, 1997

[54] VECHICLE MOUNTED ATMOSPHERIC/ AQUA TURBINE HAVING SPEED RESPONSIVE INTAKE MEANS

[76] Inventors: David A. Bynum, 247 Vine St., Keller, Tex. 76244; Johnnie J. Bynum, 7314 Bridges Ave., Ft. Worth, Tex. 76118

[21] Appl. No.: 390,072

[22] Filed: Feb. 17, 1995

[51] Int. Cl.⁶ .............................. F03B 13/10; F03D 9/00
[52] U.S. Cl. .................... 290/43; 290/44; 290/54; 290/55
[58] Field of Search .................. 290/43, 44, 54, 290/55

[56] References Cited

U.S. PATENT DOCUMENTS

| | | | |
|---|---|---|---|
| 1,831,835 | 11/1931 | Allee | 290/54 |
| 3,374,849 | 3/1968 | Redman | 180/2.2 |
| 3,444,946 | 5/1969 | Waterbury | 180/2.2 |
| 3,556,239 | 1/1971 | Spahn | 180/65.2 |
| 4,229,661 | 10/1980 | Mead et al. | 290/44 |

*Primary Examiner*—Steven L. Stephan
*Assistant Examiner*—Christopher Cuneo

[57] ABSTRACT

The Atmospheric/Aqua Turbine is an apparatus for producing energy by allowing air or water to be metered by controls through an adjustable air or water scoop into twin turbines to produce electricity when the atmospheric/Aqua Turbine is installed on vehicle or a boat and the vehicle is travelling at 30 mph or more or in the case of the boat the boat is travelling at 8 to 10 mph or more.

1 Claim, 2 Drawing Sheets

VECHICLE MOUNTED ATMOSPHERIC/ AQUA TURBINE HAVING SPEED RESPONSIVE INTAKE MEANS

BACKGROUND OF INVENTION

An apparatus designed to obtain mechanical energy from the atmosphere or water.

1. Field of the Invention

The Atmospheric/Aqua Turbine is most closely related to the Wind-Charger, the Windmill and the Hydroelectric Water Turbine.

The Atmospheric/Aqua Turbine is an apparatus that can be incorporated into a vehicle for the purpose of extracting mechanical energy from the resistance of the atmosphere or water when the vehicle or boat it is installed on is in motion.

2. Description of Prior Art

The Wind-Charger, the Windmill and the Hydroelectric Water Turbine all three convert wind or water velocity into mechanical energy at fixed locations. They all depend on the wind blowing or water flowing in order to produce mechanical energy which is used to produce electricity or to pump water.

The Atmospheric/Aqua Turbine is designed to extract mechanical energy from the atmosphere or water by being incorporated into the configuration of a vehicle. The Atmospheric/Aqua Turbine has a scoop which scoops up atmospheric pressure or water and passes it through two fan chambers in order to extract mechanical energy from the atmosphere or water. The Atmospheric/Aqua Turbine will operate when the vehicle it is installed on is moving and depends on that movement instead of depending on the wind to blow or water to flow.

SUMMARY OF THE INVENTION

It is the object of this invention to harness the resistance the atmospheric pressure, 14.7 psi at sea level, presents to an automobile, train, airplane or boat being moved from one location to another and turning it into mechanical energy that can be used to perform a task. This theory can be applied to water pressure.

BRIEF DESCRIPTION

They are many ways the Atmospheric/Aqua Turbine can be constructed as long as the theory of using the resistance atmosphere pressure or water presents to a moving vehicle of any type on land the air or in water and turning it, resistance, into mechanical energy is employed. Three of the most feasible ways the Atmospheric/Aqua Turbine can be constructed follow:

1. Air or water is caught in two scoops and is delivered to the fan chamber where the pressure turns the fans which are attached to a common shaft that extends the entire length of the fan chamber with a gear box in the center of the shaft to transfer power produced.
2. Air or water is passed though a single fan chamber to produce power.
3. Using a single air scoop and two fan chambers which are connected together with a shaft which has a pulley attached to the middle of the shaft, a V type belt for connecting the Atmospheric/Aqua Turbine to the task to be preformed.

The size of the Atmospheric/Aqua Turbine determines the maximum mechanical energy it can produced. Therefore, the Atmospheric/Aqua Turbine need not be a certain size as long as enough mechanical energy is produced to perform the assigned task.

FIG. No. 1 and 2 pertain to the Preferred Embodiment.

FIG. No. 1 is a diagonal side view of the Atmospheric/Aqua Turbine with the half cone covers closed.

FIG. No. 2 is diagonal side view of the Air Scoop with the two Half Cone Covers open.

DESCRIPTION OF PREFERRED EMBODIMENT

Figure 1:
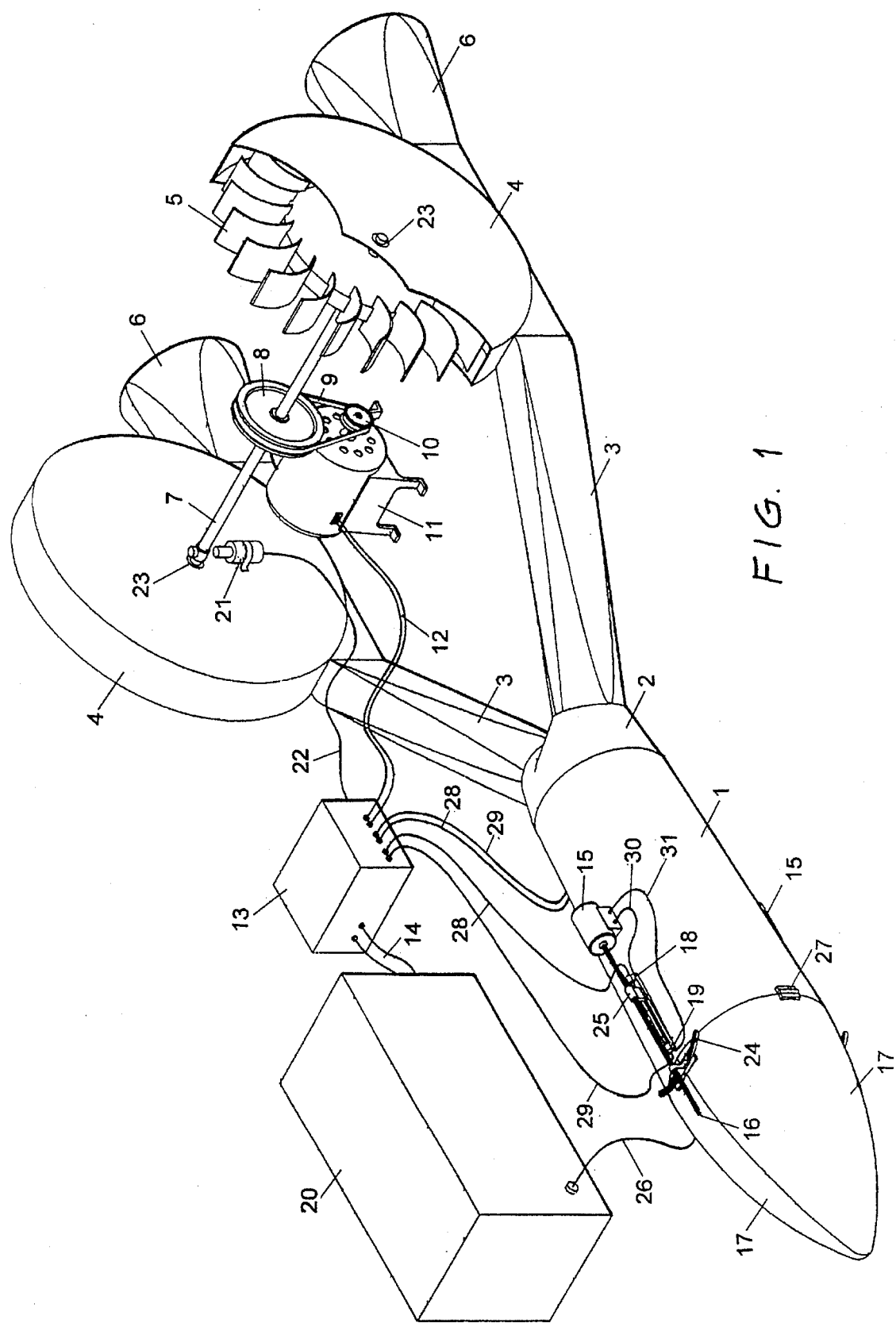
Figure 2:
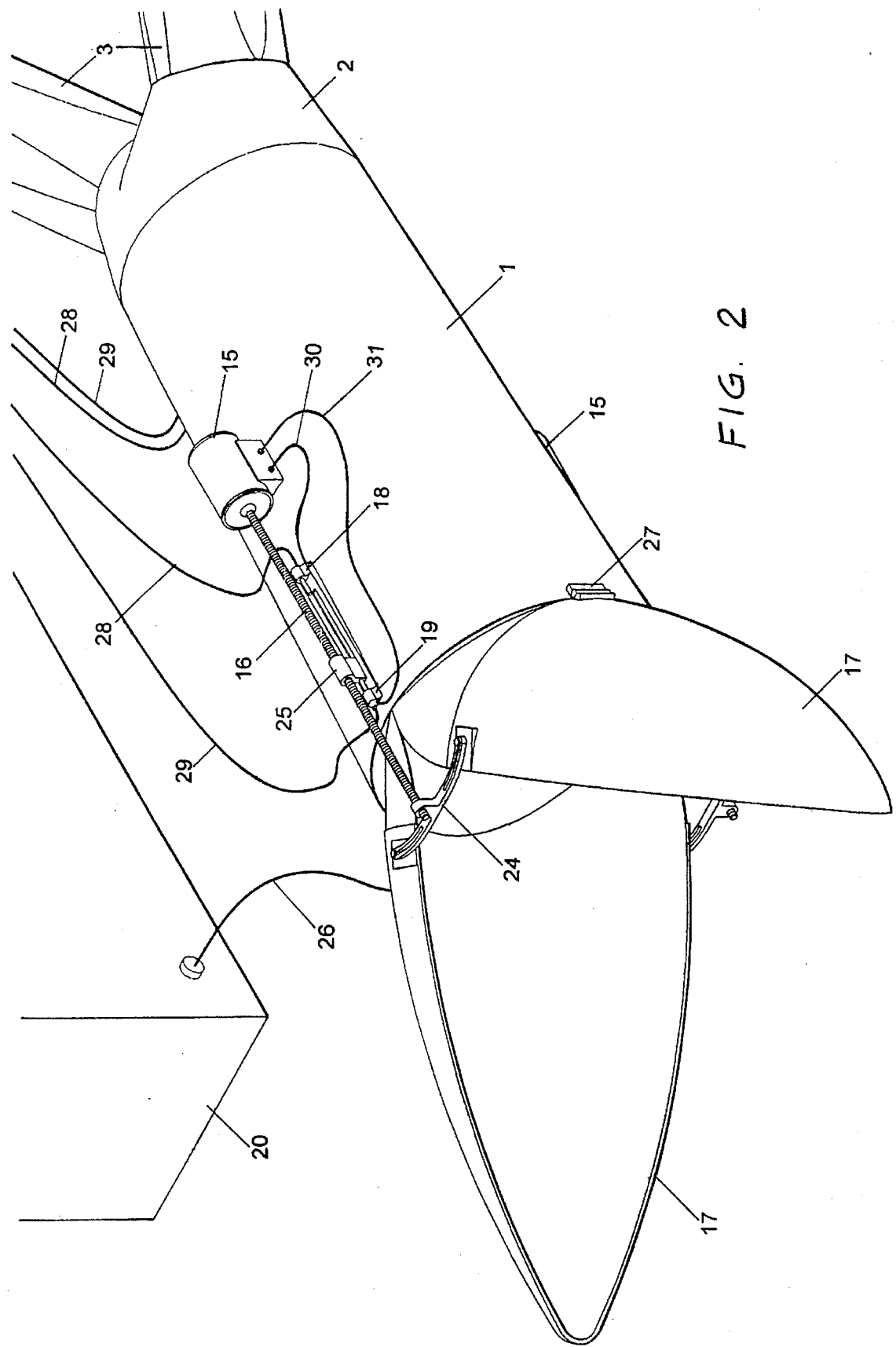

The Atmospheric/Aqua Turbine can be manufactured using metal or plastic.

Mechanical energy is produced by air being caught in the air intake scoop 1 where the air pressure is increased due to the fact that it is being pushed into the intake scoop 1 at the rate of speed the vehicle on which it is installed is traveling. The air under pressure passes from the air scoop 1 into a pre-fan tube adapter 2 then into two pre-fan chamber tubes 3 escaping through two fan chambers 4 where a fan 5 in each fan chamber is turned. The two fans 5 are mounted at each end of a common shaft 7 which extends from one fan chamber 4 to the other fan chamber 4. The air after passing through the fan chamber 4 then returns to the atmosphere by way of two exhaust tubes 6. A pulley 8 mounted on the common shaft 7 half way between the two fans 5 is connected to a generator 11 using a V type belt 9. The pulley 8 in the center of shaft 7 is ten times the size of the pulley 10 on the generator 11 thus increasing the rotation of the generator 11 to ten times that of the shaft 7. The power generated by the generator 11 is sent by two electrical lines 12 to the control box 13 then by electrical lines 14 to the battery pack 20. The control box 13 also regulates the air let into the air scoop 1 to assure constant rpm. This is accomplished by the control box 13 sensing the rpm of the common shaft 7 on which the fans 5 are mounted. A monitor 21 is located near the right end of shaft 7. The monitor monitors the rpm of shaft 7 and sends a signal to the control box 13 to adjust the two half cone covers 17 which are attached to the forward end of the air intake scoop 1. If the rpm of shaft 7 is less than the desired rpm the control box 13 sends DC current thorough the two electrical lines 28 to the open limit switches 19. The DC current flows from the open limit switches 19 through the electrical lines 31 to the DC motors 15 to cause the DC motors 15 to rotate the worm screw 16 in a counter clockwise direction thereby causing the half cone covers 17 to move toward the open position. The opening action of the two half cone covers 17 allows more air to enter the air intake scoop which increases the rpm of shaft 7 until the desired rpm of shaft 7 is reached. At the time the desired rpm is reached the control box 13 interrupts the flow of DC current through electrical lines 29 to the open limit switch 19. If the desired rpm is not reached by the time the two half cone covers. are opened to 25 degrees the stop lug on the stop lug guide 25 engages the open limit switches 18 preventing the two half cone covers 17 from opening beyond that point by interrupting the flow of DC current through electrical lines 31 to the DC motors 15. If the rpm is greater than the desired rpm the control box 13 sends DC current through the two electrical lines 28 to the closed limit switches 18. The DC current then flows from the closed limit switches 18 through the electrical lines 30 to the DC motors 15 which causes the DC motors 15 to rotate the worm screw 16 in a clockwise direction thereby causing the half cone covers 17 to move toward the closed position. The closing action of the two half cone covers allows less air to enter the air intake scoop 1 and decreases the rpm of shaft 7 until the desired rpm is reached. At the time the desired rpm is reached the control box 13 interrupts the flow of DC current through electrical lines 28. If the desired rpm is not reached by the time the two half cone covers are closed to 0 degrees the stop lug 25 on the stop lug guide engages the closed limit switches 18 to prevent the two half cone covers 17 from closing beyond that point by interrupting the flow of DC current through electrical lines 30 to the DC motors 15.

The design of the Atmospheric/Aqua Turbine is such that it causes minimal drag on the vehicle it is installed on. It was found that air tends to form an inverted cone over the air intake scoop 1 with the more compressed air entering the air intake scoop 1. The air that is unable to enter the air intake scoop 1 is sloughed off all the way around the cone of highly compressed air, very much as if the vehicle had a needle nose instead of a gaping hole for a nose. The vacuum created at the rear of the vehicle by the speed the vehicle is traveling tends to pull air through the Atmospheric/Wind Turbine further reducing the drag on the vehicle by eliminating the vacuum at the rear of the vehicle.

Although one form of this form of this invention has been illustrated and described, it is not limited thereto except insofar as such limitations are included in the following claims.

We claim:

1. An air or water twin turbine system, mounted on a vehicle, for the purpose of producing electricity, comprising:

1) a pre-fan chamber adapter, two pre-fan tubes, two turbine chambers and twin turbines wherein the pre-fan chamber adapter directs the air or water into each of the two pre-fan chamber tubes where the water or air after passing through the two pre-fan chamber tubes then passes through the two turbine chambers where it, the water or air, turns the twin turbines before returning to the atmosphere or body of water;

2) a common shaft coupling the twin turbines, a V type pulley mounted on the common shaft and a generator having a rotary shaft with a pulley mounted thereon wherein the V type pulley mounted on the common shaft is connected to the pulley on the generator by means of a V type belt or a gear box to turn the generator at a speed ratio, with respect to the common shaft speed, of greater than 1 to 1;

3) the rotation of the twin turbines causes the generator to rotate and produce electricity;

4) an air or water scoop having two half cone covers, two worm screws, worm screw mounting brackets, two small DC motors with motor mounts, a control box and a shaft speed monitor wherein the electricity produced as stated in 3) above is regulated by the control box that receives input from the shaft speed monitor which monitors the speed of the common shaft and adjusts the intake of air or water into the air or water scoop by means of the half cone covers wherein the intake of air or water into the air or water scoop is controlled by utilizing the two half cone covers along with the two worm screws reciprocal with the worm screw mounting brackets, and the two small DC motors with motor mounts that operate in conjunction with the control box to regulate the air or water entering the air or water scoop thereby keeping the generator turning at a constant speed independent in relation to the speed of the vehicle on which the twin turbine system is installed;

5) battery charging means wherein the electricity produced by the generator can be used to extended to charge on a battery or batteries.

* * * * *